United States Patent
Goldberg et al.

(10) Patent No.: US 7,879,946 B2
(45) Date of Patent: *Feb. 1, 2011

(54) POLYETHYLENE PIPE RESINS

(75) Inventors: Anne Goldberg, Leuze-en-Hainaut (BE); Fabian Siberdt, Brussels (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 661 days.

This patent is subject to a terminal disclaimer.

(21) Appl. No.: 11/783,882

(22) Filed: Apr. 12, 2007

(65) Prior Publication Data

US 2007/0276111 A1   Nov. 29, 2007

Related U.S. Application Data

(63) Continuation of application No. 10/512,978, filed as application No. PCT/EP03/04232 on Apr. 22, 2003, now abandoned.

(30) Foreign Application Priority Data

Apr. 30, 2002   (EP) .................................. 02076729

(51) Int. Cl.
*C08F 8/00* (2006.01)
*C08L 23/04* (2006.01)

(52) U.S. Cl. ...................................... 525/191; 525/240

(58) Field of Classification Search ................. 525/191, 525/240
See application file for complete search history.

(56) References Cited

U.S. PATENT DOCUMENTS

| | | | |
|---|---|---|---|
| 2004/0157988 A1 | 8/2004 | Miserque et al. | |
| 2004/0181010 A1 | 9/2004 | Miserque et al. | |
| 2004/0204542 A1 | 10/2004 | Mattioli et al. | |

FOREIGN PATENT DOCUMENTS

| | | | |
|---|---|---|---|
| EP | 1 041 113 A1 | 10/2000 | |
| EP | 1 146 078 A1 | 10/2001 | |
| EP | 1 146 079 A1 | 10/2001 | |
| EP | 1 201 713 A1 | 5/2002 | |
| EP | 1 201 771 A1 | 5/2002 | |

*Primary Examiner*—Nathan M Nutter
(74) *Attorney, Agent, or Firm*—Nixon & Vanderhye

(57) ABSTRACT

A polyethylene resin comprising from 44 to 55 wt % of a high molecular weight polyethylene fraction, and from 45 to 56 wt % of a low molecular weight polyethylene fraction; the high molecular weight polyethylene fraction comprising a linear low density polyethylene having a density of from 0.913 to 0.923 g/cm$^3$, and an HLMI of from 0.02 to 0.2 g/10 min; and the low molecular weight polyethylene fraction comprising a high density polyethylene having a density of at least 0.969 g/cm$^3$ and an MI$_2$ of greater than 100 g/10 min; wherein the relationship between the density D of the resin in g/cm$^3$ and the weight fraction of the low molecular weight fraction P$_1$ is defined by $0.055P_1 + 0.916 < D < 0.034P_1 + 0.937$.

20 Claims, No Drawings

POLYETHYLENE PIPE RESINS

RELATED APPLICATIONS

This application is a continuation of U.S. application Ser. No. 10/512,978, filed Oct. 29, 2004, now abandoned which is a §371 of International Application No. PCT/EP03 04232, filed Apr. 22, 2003, which claims priority of European Patent Application No. EP 02076729.9, filed Apr. 30, 2002, the contents of all of which are incorporated herein by reference.

The present invention relates to polyethylene resins, more particularly those suitable for use as pipe resins, and to a process for producing such resins. The present invention also relates to the use of polyethylene compounds comprising such resins for the manufacture of pipes and fittings, and to such pipes and fittings themselves.

Polyolefins such as polyethylenes which have high molecular weight generally have improved mechanical properties over their lower molecular weight counterparts. However, high molecular weight polyolefins can be difficult to process and can be costly to produce.

For many HDPE applications, polyethylene with enhanced toughness, strength and environmental stress cracking resistance (ESCR) is important. These enhanced properties are more readily attainable with high molecular weight polyethylene. However, as the molecular weight of the polymer increases, the processibility of the resin decreases. By providing a polymer with a broad or bimodal molecular weight distribution (MWD), the desired properties that are characteristic of high molecular weight resins are retained while processability, particularly extrudability, is improved.

There are several methods for the production of bimodal or broad molecular weight distribution resins: melt blending, reactor in series configuration, or single reactor with dual site catalysts. Melt blending suffers from the disadvantages brought on by the requirement of complete homogenisation and high cost. Use of a dual site catalyst for the production of a bimodal resin in a single reactor is also known.

Metallocene catalysts are known in the production of polyolefins. For example, EP-A-0619325 describes a process for preparing polyolefins such as polyethylenes having a multimodal or at least bimodal molecular weight distribution. In this process, a catalyst system which includes at least two metallocenes is employed. The metallocenes used are, for example, a bis(cyclopentadienyl)zirconium dichloride and an ethylene-bis(indenyl)zirconium dichloride. By using the two different metallocene catalysts in the same reactor, a molecular weight distribution is obtained which is at least bimodal.

EP-A-0881237 discloses the production of bimodal polyolefins with metallocene catalysts in two reaction zones. The metallocene catalyst component comprises a bis-tetrahydro indenyl compound of the general formula $(IndH_4)_2R''MQ_2$ in which each Ind is the same or different and is indenyl or substituted indenyl, R" is a bridge which comprises a $C_1$-$C_4$ alkylene radical, a dialkyl germanium or silicon or siloxane, or an alkyl phosphine or amine radical, which bridge is substituted or unsubstituted, M is a Group IV metal or vanadium and each Q is hydrocarbyl having 1 to 20 carbon atoms or halogen. That specification discloses that the density of the multimodal polyolefin resins particularly falls in the range 0.9 to 0.97 g/ml, preferably 0.92 to 0.97 g/ml and that the HLMI of the polyolefin resins particularly falls within the range 0.1 to 45,000 g/10 min, preferably in the range 0.4 to 45,000 g/10 min. Thus, that specification discloses the production of polyolefin resins having a wide variety of properties.

EP-A-0989141 discloses a process for the preparation of polyethylenes having a multimodal molecular weight distribution. The catalyst may employ a metallocene catalyst comprising a bis-tetrahydro indenyl compound as disclosed in EP-A-0881237. The specification discloses the production of pipe resins. In Example 1 of that specification, the polyethylene resin chemical blend (in its extruded form, which means the polyethylene resin together with additional additives such as pigments, fillers and antioxidants) had a density of 0.956 g/ml which in turn means that the polyethylene resin per se had a density significantly less than 0.95 g/ml. There is a need to produce a polyethylene resin having improved mechanical properties yet with good processibility.

Polyethylene resins are known for the production of pipes and fittings. Pipe resins require high stiffness (creep rupture strength), combined with a high resistance against slow crack growth as well as resistance to crack propagation yielding impact toughness. However, there is the need to improve the creep rupture strength of currently available pipe resins, keeping the resistance against slow crack growth and the rapid crack propagation at least at a constant level. This would allow to increase the pressure rating of such pipes.

Polyethylene pipes are widely used as they are lightweight and can be easily assembled by fusion welding. Polyethylene pipes also have a good flexibility and impact resistance, and are corrosion free. Unless polyethylene pipes are reinforced, they are however limited in their hydrostatic resistance by the inherent low yield strength of polyethylene. It is generally accepted that the higher the density of the polyethylene, the higher will be the long term hydrostatic strength. Pipe resins are known in the art which are referred to by the names "PE 80" and "PE 100". This classification is described in ISO 9080 and ISO 12162. These are polyethylene resins which when used for the formation of pipes of specific dimensions, survive a long term pressure test at different temperatures for a period of 5,000 hours. Extrapolation according to ISO 9080 shows that they have an extrapolated 20° C./50 years stress at a lower prediction level (97.5% confidence level—"LPL") of at least 8 and 10 MPa. There is a need in the art for polyethylene pipe resins which exceed these test requirements. Currently, for polyethylene the highest hydrostatic strength which can be tolerated based on an extrapolation of the hoop stress/lifetime relationship at a temperature of 20° C. for a period of 50 years is an LPL of 10 MPa. This corresponds to a PE 100 resin. The density of the current basic powder used in the production of a PE100 compound is close to 0.950 g/cm³ (typically from 0.949 to 0.951 g/cm³). Such polyethylene resins containing conventional amounts of black pigments have densities from about 0.958 to 0.960 g/cm³. There is now a desire in the art to produce a resin which when transformed into the form of a pipe, is capable of withstanding an LPL stress of 12.5 MPa at a temperature of 20° C. for a period of 50 years. Using the current terminology in the art, such a resin is known as a "PE125 grade" resin. Currently no such resins are commercially available.

It is known in the art that the key components for a good PE 100 resin are the combination of a low molecular weight high density polyethylene with little or no short chain branching (SCB) due to comonomer incorporation and a linear low density polyethylene (LLDPE) resin with high molecular weight and SCB.

Usually, polyethylene resins of such composition are produced in a cascade reactor process using Ziegler-Natta catalysts. Another variant might be to blend different polyethylene powders and extrude them to form a physical blend, as opposed to a chemical blend produced using a cascade reactor. However, physical blending often leads to a poor mixing of the melts, which leaves large high molecular weight microscopic particles (referred to as gels in the art) embedded in the final product. The weight fraction of the LLDPE resin is around 50% of the blend. The low molecular weight high density polyethylene (HDPE) confers a high crystallinity, and thus a high rigidity and resistance to creep for the blend, and depresses the melt viscosity of the blend. The high molecular weight LLDPE provides the polyethylene blend with a high density of tie-molecules as a result of the short chain branching, which are responsible for the enhanced environmental stress crack growth resistance (ESCR) observed in these blends.

WO 00/60001 discloses a high density multimodal polyethylene for use in pipes, wherein the high molecular weight fraction has a density less than 0.930 g/cm$^3$ and an HLMI of less than 0.30 g/10 min. Preferably the HMW fraction has a density of less than 0.923 g/cm$^3$. It is also preferred that it has an HLMI of less than 0.20 g/10 min, and that the overall density of the resin is below 0.945 g/cm$^3$. There is no general disclosure regarding the properties of the low molecular weight fraction. WO 00/60001 discloses specific examples of resins comprising equal amounts of a low molecular weight fraction and a high molecular weight fraction, wherein the high molecular weight fraction has a density of 0.927 g/cm$^3$ and HLMI of 0.19 g/10 min in one Example, and a density of 0.922 g/cm$^3$ and HLMI of 0.25 g/10 min in the other Example. No data is given regarding creep performance, and it is clear that the resins disclosed are PE 80 and PE 100 type.

Our own copending application WO 02/34829 discloses a high density multimodal polyethylene for use in pipes, wherein the high molecular weight fraction comprises up to 49 wt % of the resin, and has a density less than 0.928 g/cm$^3$ and an HLMI of less than 0.60 g/10 min. In Example 4, the HLMI of the high molecular weight fraction is 0.03 g/10 min and its density 0.919 g/cm$^3$, but it comprises 43.1 wt % of the resin.

Copending application WO 03/016396 discloses a bimodal resin comprising a low molecular weight ethylene homopolymer having a molecular weight distribution less than 8, and a homogeneous high molecular weight ethylene copolymer, the resin having a ductile-brittle transition temperature of less than −20° C. The resins disclosed in this application have a relatively poor balance between performance and processability, as characterised by dynamical viscosity measurements, compared with those of the present invention described below.

We have found that by selecting a particular combination of properties it is possible to obtain resins with superior properties to those of the prior art. Accordingly, the present invention provides in a first aspect a polyethylene resin comprising from 44 to 55 wt % of a high molecular weight polyethylene fraction, and from 45 to 56 wt % of a low molecular weight polyethylene fraction;

the high molecular weight polyethylene fraction comprising a linear low density polyethylene having a density of from 0.913 to 0.923 g/cm$^3$, and an HLMI of from 0.02 to 0.2 g/10 min;

and the low molecular weight polyethylene fraction comprising a high density polyethylene having a density of at least 0.969 g/cm$^3$ and an MI$_2$ of greater than 100 g/10 min;

wherein the relationship between the density D of the resin in g/cm$^3$ and the weight fraction of the low molecular weight fraction P$_1$ is defined by $0.055P_1+0.916<D<0.034P_1+0.937$.

The present invention further provides the use of such a polyethylene resin for the manufacture of pipes and fittings, and in a further aspect a pipe or a fitting comprising the polyethylene resin of the invention.

The present invention also provides a process for the preparation of a polyethylene resin having a bimodal molecular weight distribution which comprises:

(i) contacting ethylene monomer and a first co-reactant with a catalyst system in a first reaction zone under first polymerisation conditions to produce a first polyethylene; and (ii) contacting ethylene monomer and a second co-reactant with a catalyst system in a second reaction zone under second polymerisation conditions to produce a second polyethylene different from the first polyethylene;

wherein the first and second polyethylenes are blended together, to form a polyethylene resin comprising from 44 to 55 wt % of a first polyethylene fraction of high molecular weight and from 45 to 56 wt % of a second polyethylene fraction of low molecular weight, the first polyethylene fraction comprising a linear low density polyethylene having a density of 0.913 to 0.923 g/cm$^3$, and an HLMI of less than 0.2 g/10 min and the second polyethylene fraction comprising a high density polyethylene having a density of at least 0.969 g/cm$^3$ and an MI$_2$ of greater than 100 g/10 min, and the polyethylene resin having a relationship between the density D of the resin in g/cm$^3$ and the weight fraction of the low molecular weight fraction P$_1$ defined by $0.055P_1+0.916<D<0.034P_1+0.937$, wherein one of the co-reactants is hydrogen and the other is a comonomer comprising a 1-olefin containing from 3 to 12 carbon atoms.

Preferably the density D of the polyethylene resin is at least 0.945 g/cm$^3$. Preferably the HLMI of the high molecular weight polyethylene fraction is from 0.02 to 0.15 g/10 min.

Preferably the relationship between the density D of the resin in g/cm$^3$ and the weight fraction of the low molecular weight fraction P$_1$ is defined by $0.55P_1+0.919<D<0.034P_1+0.937$.

The resin of the present invention preferably comprises less than 54% by weight of the second polyethylene fraction of low molecular weight, most preferably between 48 and 53 weight %. It preferably comprises at least 46% by weight of the first polyethylene fraction of high molecular weight, most preferably at least 47 weight %.

Preferably, for the high density fraction the MI$_2$ is from 200 to 1000 g/10 min, more preferably from 300 to 1000 g/10 min.

Preferably, for the low density fraction, the HLMI is from 0.02 to 0.15 g/10 min, more preferably from 0.02 to 0.1 g/10 min.

For the low density fraction, the density is preferably from 0.915 to 0.922 g/cm$^3$.

For the high density fraction, the density is preferably from 0.970 to 0.990 g/cm$^3$, more preferably from 0.971 to 0.980 g/cm$^3$.

Preferably, the overall density of the resin is from 0.945 to 0.955 g/cm$^3$, more preferably from 0.948 to 0.954 g/cm$^3$. Preferably, for the polyethylene resin, the HLMI is from 3 to 50 g/10 min, more preferably from 5 to 25 g/10 min.

In this specification the melt index MI$_2$ and high load melt index HLMI are measured in accordance with ASTM D-1238 at 190° C. with respective loads of 2.16 and 21.6 kg. For MI$_2$, this standard requires an 8/2 die, although for convenience measurements have also been made using an 8/1 die, which gives values slightly more than 0.05 of those with the 8/2 die.

In this specification the density is measured in accordance with ISO 1183.

For the high density polyethylene fraction, the polydispersity index D (represented by the ratio Mw/Mn as determined by gel permeation chromatography (GPC)) is preferably from 2 to 6. For the linear low density polyethylene fraction of high molecular weight the value of polydispersity index D is preferably from 2 to 6.

Preferably, the overall polyethylene resin has a molecular weight distribution Mw/Mn from 8 to 40.

Preferably, the low density fraction is a copolymer of ethylene and another alpha-olefin containing from 3 to 12 carbon atoms. More preferably, the low density fraction is a copolymer of ethylene and butene, methylpentene, hexene and/or octene.

Preferably, the high density fraction is an ethylene homopolymer.

The present inventors have found that such blends of polyethylene, having such a specific composition, molecular weight and density, can provide excellent mechanical properties when the resin is used as a pipe resin, while maintaining or improving processing behaviour as compared to known pipe resins. Typically, the pipe resins produced in accordance with the invention exhibit a higher slow crack growth resistance and impact strength at low temperature while maintaining a better creep resistance than the currently obtainable PE 100 type resins. The resins according to the invention are therefore well suited for the manufacture of pipes, in particular high pressure pipes and for the manufacture of fittings. When used for the manufacture of pipes, the resins are most often blended with usual additives such as antioxidants, antiacids and colourants.

Generally, the pipe resins produced in accordance with the invention exhibit a time to failure under the FNCT test specified in ISO DIS 16770 performed at 80° C. under 5 Mpa stress on 10×10 mm specimens taken from compressed-plates comprising 1600 μm depth notches of at least 500 hours, indicating good slow crack growth resistance.

The resins of the invention are also believed to show good creep resistance. Creep resistance is typically measured according to ISO 1167 on 32 mm diameter SDR11 pipes to determine the lifetime prior to failure at a temperature of 20° C. and a stress of 13 MPa, 13.7 or 13.9 MPa. The resins of the invention are anticipated to have a creep resistance of at least 500 hours and typically above 1000 hours at a temperature of 20° C. and a pressure of 13 MPa, and a creep resistance of at least 500 hours at 20° C. and 13.7 MPa, and in some cases a creep resistance of at least 100 hours at 20° C. and 13.9 MPa. Creep resistances at such levels mean that the resins of the invention could be assigned a minimum required strength (MRS) rating according to the ISO/TR 9080 standard which is higher than the MRS 10 rating (for PE100 resins), such as a MRS 11.2 rating or even an MRS 12.5 rating, which equates to a "PE125" resin. This rating is determined according to a statistical method and the minimum required strength MRS is defined as a classified lower prediction limit (LPL) at a 97.5% confidence interval.

An indication of the expected behaviour in the above creep tests can be obtained by performing creep tests on samples in the shape of "dogbones" formed from compression moulded rectangular plagues having a nominal thickness of about 2 mm, at stresses of 11.2 MPa or 11.4 MPa. The resins of the present invention preferably have a time to failure in this test of greater than 500 hours for a stress of 11.2 MPa, and greater than 250 hours for 11.4 MPa.

Resins in accordance with the invention may be prepared using a metallocene catalyst more preferably a bis-tetrahydroindenyl (THI) metallocene catalyst. They are characterised by a higher shear-thinning behaviour than known bimodal PE 100 resins. This means less sagging of the polyethylene resins when being extruded at low shear rates when forming pipes, and good injection-moulding capability for the resins when used to produce injection moulded pipe fittings.

The polyethylene resins of the invention can be prepared by polymerising ethylene to produce two polyethylene fractions having different molecular weights so as to produce high density and low density polyethylene fractions. The resultant blend has a bimodal molecular weight distribution. The high density and low density polyethylene fractions can alternatively be made in a single reactor using a multisite catalyst, in which case the properties of each fraction can be calculated theoretically.

The polyethylene resins of the invention produced with the preferred metallocene catalyst, and most preferably with the THI catalyst, generally have a lower capillary viscosity $\mu^2$ than commercial PE100 resins. Preferably $\mu_2$ is less than 21,000 dPa·s, in contrast to known pipe resins produced using Ziegler-Natta catalysts, which typically have a $\mu_2$ greater than 21,000 dPa·s. $\mu_2$ is the value of capillary viscosity which is measured by extruding polymer by means of an extrusion device, which incorporates a piston in a cylinder, at a temperature of 190° C. through a cylindrical die of length 30 nm and diameter 2 mm at a constant speed corresponding to a shear rate of 100 s$^{-1}$ and by measuring the force transmitted by the piston during the descent of the piston. The cylinder and piston used by this test method meet the requirements of the cylinder/piston device used for fluidity index measurements according to the standard ASTM D 1238 (1996). The 12 value is then calculated by using the equation: $\mu_2=23.61\times$ Fp where Fp represents the mean force exerted by the piston during the measurement period and is expressed in decaNewtons (daN) whereas $\mu_2$ is expressed in dpa·s.

Furthermore, the polyethylene resins produced in accordance with the invention, and obtained with the preferred metallocene catalyst, and especially with the most preferred THI catalyst, generally have a dynamic viscosity $\eta_{0.01}$ at 0.01 radian/second which is much greater than 200,000 Pa·s. In contrast, known pipe resins produced using Ziegler-Natta catalysts have a $\eta_{0.01}$ less than 200,000 Pa·s. In addition, the resins of the invention produced using a metallocene catalyst, and particularly the preferred THI catalyst, generally have a ratio $\eta_{0.01}/\eta_1$ greater than 8, preferably greater than 10, where $\eta_1$ is the dynamic viscosity at 1 radian/second, express in Pa·s. In contrast, known pipe resins produced using a Ziegler-Natta catalyst have a $\eta_{0.01}/\eta_1$ ratio typically much less than 8, most typically around 5.

The determination of dynamical viscosity is made by using an oscillatory rheometer, preferably a Rheometric Scientific ARES rheometer. This method has been extensively described in the literature devoted to polymer rheology (see e.g. W. W. Graessley, Chapter 3 in Physical Properties of Polymers, 2nd Edition, ACS Professional Reference Book, Washington D.C., 1993).

The measurements are performed on a Rheometric Scientific ARES rheometer between two 25 mm diameter plates; the gap between the plates is between 1 and 2 mm, and is thoroughly adapted according to the suitable thickness of the polymer sample once this latter has been inserted between the plates and warmed up to 190° C. The gap value is then recorded to be taken into account by the calculation software.

The sample is then temperature-conditioned for a period of 5 minutes before the measurement is started. The measurement is performed at 190° C. After temperature conditioning, the measurement starts by applying an oscillatory strain $\gamma^*(\omega, t)=\gamma_M \cdot e^{j\omega t}$, with a given amplitude $\gamma_M$ and a given frequency $\omega$ to the bottom plate via a precision motor, whereas the top plate is kept fixed. The amplitude $\gamma_M$ of this shear strain has been chosen in the linear zone of viscoelasticity of the polymer and is kept constant through the whole requirement experiment. The oscillation frequency ω is varied through the range [$10^{-2}$-$10^{+2}$] radians/second. The oscillating shear strain is translated inside the material into an oscillating shear stress $\sigma^*(\omega,t)$, which in-phase and out-of-phase components are recorded as functions of the frequency ω, and used for the calculation of the complex modulus $G^*(\omega)$ as well as complex viscosity $\eta^*(\omega)$ of the polymer:

$$G^*(\omega) = \frac{\sigma^*(\omega, t)}{\gamma^*(\omega, t)} = G_m(\omega) \cdot e^{i\delta(\omega)} = G'(\omega) + i \cdot G''(\omega)$$

$$G_m(\omega) = \sqrt{G'^2(\omega) + G''^2(\omega)} \; ; \; \tan\delta(\omega) = \frac{G''(\omega)}{G'(\omega)}$$

$$\eta^*(\omega) = \eta'(\omega) - i \cdot \eta''(\omega) = \frac{G''(\omega)}{\omega} - i \cdot \frac{G'(\omega)}{\omega}$$

$$\|\eta^*(\omega)\| = \frac{\sqrt{G'^2(\omega) + G''^2(\omega)}}{\omega}$$

According to the Cox-Merz rule, the function of the absolute value of the complex viscosity $\|\eta^*(\omega)\|$ is the same as the conventional viscosity function, (capillary viscosity as a function of shear rate γ), if frequency is taken in rad/s. If this empiric equation is valid, the absolute value of the complex modulus corresponds to the shear stress in conventional (that is steady state) viscosity measurements.

In the present invention, the dynamic viscosities of the resin measured at 0.01 and 1 rad/s respectively according to the aforementioned method are defined as $\eta_{0.01}=\|\eta^*(0.01 \text{ rad/s})\|$ and $\eta_1=\|\eta^*(1 \text{ rad/s})\|$.

The polyethylene resins in accordance with the invention preferably satisfy the following relationship $\eta_{0.01}/\eta_1 \geq \{(0.293 \times M_w/M_n)+3.594\}$ The polyethylene resins in accordance with the invention preferably satisfy the following relationship:

$\eta_{0.01}/\eta_1 \geq \{(-0.302 \times HLMI)+9.499\}$

A further aspect of the invention provides a polyethylene resin having a dynamical viscosity $\eta_{0.01}$, measured at 0.01 radian/second, of greater than 200,000 Pa·s and a ratio of dynamical viscosities measured at respectively 0.01 and 1 radian/second, $\eta_{0.01}/\eta_1$, of greater than 8, and a time to failure at a stress of 11.2 MPa and a temperature of 23C in a creep test as previously defined of greater than 500 hours.

In all aspects of the invention, it is preferred that the resin has a dynamical viscosity $\eta_{0.01}$, measured at 0.01 radian/second, of greater than 500,000 Pa·s. It is also generally preferred that the ratio of dynamical viscosities measured at respectively 0.01 and 1 radian/second, $\eta_{0.01}/\eta_1$, is greater than 10.

The use of metallocene catalysts, for example the bis-tetrahydro indenyl metallocene catalyst enables the production of both low and high density fractions having narrow molecular weight distributions.

The polyethylene resins of the invention can outperform the current best available bimodal polyethylene PE 100 grade resins as regards properties relating to the fabrication and use of polyethylene pipes. In particular, the resins of the invention are believed to have better impact resistance, better slow crack resistance and a higher creep resistance than currently available PE 100 grade resins. In particular, the resins of the invention which are prepared with the preferred metallocene catalysts, especially THI catalysts, also show excellent rheological behaviour, ie they have a similar or lower viscosity at higher shear rates (typically around 100 s$^{-1}$) and a much higher viscosity at low shear rates (0.1 s$^{-1}$ or below). These resins have reduced sagging following extrusion of the pipe resin into a pipe together with an improvement of the injection mouldability.

Within the ambit of the relationship between the weight fractions and density of the low and high density fractions, as a general rule any decrease of the density of the LLDPE should be compensated by an increase of the density of the HDPE. Since the density of the HDPE fraction generally increases with increase $MI_2$, a higher $MI_2$ will result. For certain blends, two or more weight fractions of LLDPE may satisfy the two essential criteria of HLMI and density.

The polyethylene resins according to the invention can be prepared by different methods, such as melt blending, reactor in series configuration or single reactor with dual site catalysts.

Preferably, the high density and low density fractions of the polyethylene resin according to the invention are produced in at least two separate reactors, most preferably two such reactors in series. In such a case, the high density fraction is preferably prepared first, so that the low density fraction is prepared in the presence of the high density fraction.

The resultant blend has a bimodal molecular weight distribution. The catalyst employed in the polymerisation process may be any catalyst(s) suitable for preparing the low and high density fractions. Preferably, the same catalyst produces both the high and low molecular weight fractions. For example, the catalyst may be a chromium catalyst, a Ziegler-Natta catalyst, or most preferably a metallocene catalyst.

Metallocenes may typically be represented by the general formula: $(C_5R_n)_y Z_x (C_5R_m)ML_{(4-y-1)}$ where $(C_5R_n)_y$ and $(C_5R_m)$ are cyclopentadienyl ligands,
R is hydrogen, alkyl, aryl, alkenyl, etc.
M is a Group IVA metal
Z is a bridging group,
L is an anionic ligand, and
y is 0, 1 or 2, n and m are from 1 to 5, x is 0 or 1.

The most preferred complexes are those wherein y is 1 and L is halide or alkyl. Typical examples of such complexes are bis(cyclopentadienyl)zirconium dichloride and bis(cyclopentadienyl zirconium dimethyl. In such metallocene complexes the cyclopentadienyl ligands may suitably be substituted by alkyl groups such as methyl, n-butyl or vinyl. Alternatively the R groups may be joined together to form a ring substituent, for example indenyl or fluorenyl. The cyclopentadienyl ligands may be the same or different. Typical examples of such complexes are bis(n-butylcyclopentadienyl)zirconium dichloride or bis(methylcyclopentadienyl) zirconium dichloride.

Examples of such complexes may be found in EP 129368 and EP 206794 the disclosures of which are incorporated herein by reference.

Another type of metallocene complex is constrained geometry complexes in which the metal is in the highest oxidation state. Such complexes are disclosed in EP 416815 and WO 91/04257 both of which are incorporated herein by reference. The complexes have the general formula:

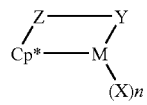

wherein:

Cp* is a single η5-cyclopentadienyl or η5-substituted cyclopentadienyl group optionally covalently bonded to M through —Z—Y— and corresponding to the formula:

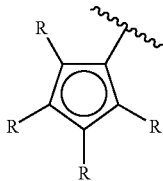

wherein each R is independently hydrogen or a moiety selected from halogen, alkyl, aryl, haloalkyl, alkoxy, aryloxy, silyl groups, and combinations thereof of up to 20 non-hydrogen atoms, or two or more R groups together form a fused ring system;

M is zirconium, titanium or hafnium bound in an η5 bonding mode to the cyclopentadienyl or substituted cyclopentadienyl group and is in a valency state of +3 or +4;

each X is independently hydride or a moiety selected from halo, alkyl, aryl, silyl, germyl, aryloxy, alkoxy, amide, siloxy, and combinations thereof (e.g. haloalkyl, haloaryl, halosilyl, alkaryl, aralkyl, silylalkyl, aryloxyaryl, and alkyoxyalkyl, amidoalkyl, amidoaryl) having up to 20 non-hydrogen atoms, and neutral Lewis base ligands having up to 20 non-hydrogen atoms;

n is 1 or 2 depending on the valence of M;

Z is a divalent moiety comprising oxygen, boron, or a member of Group 14 of the Periodic Table of the Elements; and Y is a linking group covalently bonded to the metal comprising nitrogen, phosphorus, oxygen or sulfur, or optionally Z and Y together form a fused ring system.

Most preferred complexes are those wherein Y is a nitrogen or phosphorus containing group corresponding to the formula (—NR$^1$) or (—P R$^1$) wherein R$^1$ is $C_1$-$C_{10}$ alkyl or $C_6$-$C_{10}$ aryl and wherein Z is SiR"$_2$, CR"$_2$, SiR"$_2$SiR"$_2$, CR"=CR" or GeR"$_2$ in which R" is hydrogen or hydrocarbyl.

Most preferred complexes are those wherein M is titanium or zirconium.

Further examples of metallocene complexes are those wherein the anionic ligand represented in the above formulae is replaced with a diene moiety. In such complexes the transition metal may be in the +2 or +4 oxidation state and a typical example of this type of complex is ethylene bis indenyl zirconium (II) 1,4-diphenyl butadiene. Examples of such complexes may be found in EP 775148A and WO 95/00526 the disclosures of which are incorporated herein by reference.

For example the complexes may have the general formiula:—

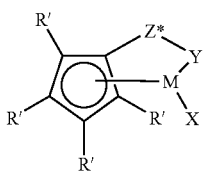

wherein:

R' each occurrence is independently selected from hydrogen, hydrocarbyl, silyl, germyl, halo, cyano, and combinations thereof, said R' having up to 20 non hydrogen atoms, and optionally, two R' groups (where R' is not hydrogen, halo or cyano) together form a divalent derivative thereof connected to adjacent positions of the cyclopentadienyl ring to form a fused ring structure;

X is a neutral η$^4$-bonded diene group having up to 30 non-hydrogen atoms, which forms a π-complex with M;

Y is —O—, —S—, —NR*—, —PR*—;

M is titanium or zirconium in the +2 formal oxidation state;

Z* is SiR$_2$, CR*$_2$, SiR*$_2$SiR*$_2$, CR*$_2$CR*$_2$, CR*=CR*, CR$_2$SiR*$_2$, or GeR*$_2$;

wherein:

R* in each occurrence is independently hydrogen, or a member selected from hydrocarbyl, silyl, halogenated alkyl, halogenated aryl, and combinations thereof, said R* having up to 10 non-hydrogen atoms, and optionally, two R* group from Z* (when R* is not hydrogen), or an R* group from Z* and an R* group from Y form a ring system.

The metallocene catalyst component preferably comprises a bis-tetrahydroindenyl compound (THI). Preferably each catalyst system comprises (a) a metallocene catalyst component comprising a bis-tetrahydroindenyl compound of the general formula (IndH$_4$)$_2$R"MQ$_2$ in which each IndH$_4$ is the same or different and is tetrahydroindenyl or substituted tetrahydroindenyl, R" is a bridge which comprises a $C_1$-$C_4$ alkylene radical, a dialkyl germanium or silicon or siloxane, or an alkyl phosphine or amine radical, which bridge is substituted or unsubstituted, M is a Group IV metal or vanadium and each Q is hydrocarbyl having 1 to 20 carbon atoms or halogen; and (b) a cocatalyst which activates the catalyst component.

With the preferred bis-tetrahydroindenyl catalyst, each bis-tetrahydroindenyl compound may be substituted in the same way or differently from one another at one or more positions in the cyclopentadienyl ring, the cyclohexenyl ring and the ethylene bridge. Each substituent group may be independently chosen from those of formula XR$_v$ in which X is chosen from group IVB, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted.

In a particularly preferred embodiment, both indenyls are unsubstituted.

R" is preferably an ethylene bridge which is substituted or unsubstituted.

The metal M is preferably zirconium, hafnium or titanium, most preferably zirconium. Each Q is the same or different and may be a hydrocarbyl or hydrocarboxy radical having 1-20 carbon atoms or a halogen. Suitable hydrocarbyls include aryl, alkyl, alkenyl, alkylaryl or aryl alkyl. Each Q is preferably halogen. Ethylene bis(4,5,6,7-tetrahydro-1-indenyl)zirconium dichloride is a particularly preferred bis tetrahydroindenyl compound of the present invention.

The metallocene catalyst component used in the present invention can be prepared by any known method. A preferred preparation method is described in J. Organomet. Chem. 288, 63-67 (1985).

The cocatalyst which activates the metallocene catalyst component can be any cocatalyst known for this purpose such as an aluminium-containing cocatalyst, a boron-containing cocatalyst or a mixture of those. The aluminium-containing cocatalyst may comprise an alumoxane, an alkyl aluminium and/or a Lewis acid.

The alumoxanes used in the process of the present invention are well known and preferably comprise oligomeric linear and/or cyclic alkyl alumoxanes represented by the formula:

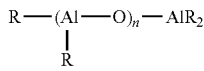 (I)

for oligomeric, linear alumoxanes and

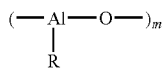 (II)

for oligomeric, cyclic alumoxanes,
wherein n is 1-40, preferably 10-20, m is 3-40, preferably 3-20 and R is a $C_1$-$C_8$ alkyl group and preferably methyl.

Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl-borato-triphenylcarbenium as described in EP-A-0427696, or those of the general formula $[L'-H]+[B\ Ar_1\ Ar_2\ X_3\ X_4]-$ as described in EP-A-0277004 (page 6, line 30 to page 7, line 7).

Preferably, the same catalyst system is used in both steps of the cascade polymerisation process to produce a chemical blend of the high and low molecular weight fractions. The catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is preferably to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalised polyolefins such as finely divided polyethylene.

Preferably, the support is a silica having a surface area comprised between 100 and 1000 $m^2/g$ and a pore volume between 0.5 and 3 ml/g.

The amount of alumoxane and metallocenes usefully employed in the preparation of the solid support catalyst can vary over a wide range. Preferably the aluminium to transition metal mole ratio is in the range between 1:1 and 800:1, preferably in the range 5:1 and 500:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene.

Preferably the support material is slurried in toluene and the metallocene and alumoxane are dissolved in toluene prior to addition to the support material.

The use of multiple reactors is a preferred aspect of the present invention. This will require a higher investment than for a single reactor system but is very conveniently done with the preferred metallocene catalyst systems employed in the present invention. With the preferred metallocene catalyst system, using two reactors in series conditions can be provided for the best resin properties. It has been shown that the combination of low short chain branching (ideally no branching) in the low molecular part of the resin and high concentration in the high molecular part significantly improves the resin properties with respect to ESCR and impact strength.

In one arrangement according to the present invention, each polyolefin is produced individually in a reactor, preferably a loop reactor, and mixed together by extrusion. The polyolefins may be mixed together by melt blending. In this way, the low molecular weight and high molecular weight parts of the polyolefin can be produced in separate reactors.

In a preferred arrangement, the product of a first cascade reaction zone, including the olefin monomer, is contacted with the second co-reactant and the catalyst system in a second cascade reaction zone to produce and mix the second polyolefin with the first polyolefin in the second reaction zone. The first and second reaction zones are conveniently interconnected reactors such as interconnected loop reactors or interconnected loop and continuously stirred reactors. It is also possible to introduce into the second reaction zone fresh olefin monomer as well as the product of the first reaction zone.

Because the second polyolefin is produced in the presence of the first polyolefin a multimodal or at least bimodal molecular weight distribution is obtained.

In one embodiment of the invention, the first co-reactant is hydrogen and the second co-reactant is the comonomer. Typical comonomers include hexene, butene, octene, pentene or methylpentene, preferably hexene.

In an alternative embodiment, the first co-reactant is the comonomer, preferably hexene. Because the metallocene catalyst components of the present invention exhibit good comonomer response as well as good hydrogen response, substantially all of the comonomer is consumed in the first reaction zone in this embodiment. Homopolymerisation takes place in the second reaction zone with little or no interference from the comonomer.

In another embodiment, hydrogen may be introduced in both the first and the second reactor.

The temperature of each reactor may be in the range of from 60° C. to 110° C., preferably from 70° C. to 90° C.

The invention will now be described in further detail with reference to the following non-limiting Examples.

EXAMPLES 1-6

Preparation of Polyethylene Bimodal Resin by Flake Blending

A: Bench Scale Preparation of the Low Molecular Weight (LNM) Polyethylene Fractions A-C Under a stream of dry nitro-en gas 1.8 millimole of tri-isobutyl aluminium (TIBAL) and 1800 ml of isobutane were introduced into a dry autoclave reactor having a volume of 5 litres and provided with an agitator. The temperature was raised to 80° C., and after pressure stabilisation hydrogen gas was added. Ethylene gas was then introduced until a partial pressure of ethylene of $10 \times 10^5$ Pa was achieved. The amount of hydrogen previously introduced into the autoclave reactor was selected so as to obtain the desired final gas phase molar ratio of hydrogen to ethylene ($H_2/C_2$ molar ratio).

The polymerisation was then started by flushing the solid catalyst A, comprising ethylene bis(4,5,6,7-tetrahydro-1-indenyl)zirconium dichloride (prepared in accordance with the method of Brintzinger as published in the Journal of Organometallic Chemistry 288 (1995) pages 63 to 67), into the autoclave with 200 ml of isobutane. The temperature, partial pressure of ethylene, and the $H_2/C_2$ ratio were kept constant over the polymerisation period. The reaction was stopped by cooling and then venting the reactor. The low molecular weight polyethylene was then collected from the reactor.

The polymerisation conditions are specified in Table 1.

B: Bench Scale Preparation of the High Molecular Weight (HMW) Polyethylene Fractions W-Z The process for preparing the high molecular weight fraction was the same as that for preparing the low molecular weight fraction specified above, except that instead of adding hydrogen after raising the temperature to 80° C., varying amounts of 1-hexene comonomer were added and a different amount of ethylene was introduced, in order to obtain the desired ethylene partial pressure and $C_6^=/C_2$ ratio. The high molecular weight ethylene-hexene copolymer obtained was collected from the reactor.

The detailed polymerisation conditions are specified in Table 2.

C: Preparation of the Polyethylene Resin Blends 1-6

In order to prepare the bimodal resin, the desired quantity of the low molecular weight polyethylene fraction obtained in Example A above was blended with the desired quantity of the high molecular weight ethylene-hexene copolymer obtained in Example B together with Irganox B225 antioxidant commercially available from CIBA Specialty Chemicals. The resulting blend was pelletised in an extruder (APV Baker under the trade name MP19TC25). The details of the blending recipes are specified in Table 3.

The density of the polyethylene is measured according to ISO 1183. HLMI is measured using the procedures of ASTM D-1238 at 190° C. using a load of 21.6 kg. $MI_2$ is measured using the procedures of ASTM D-1238 at 190° C. using a load of 2.16 kg. $\mu_0$ is the viscosity at a shear rate of $1\ s^{-1}$, and $\mu_2$ the viscosity at a shear rate of $100\ s^{-1}$, each with a die having a ratio of length to internal diameter of 30:2. Environmental stress crack resistance (ESCR) is determined by FNCT performed at 80° C. under 5 MPa stress on 10×10 mm specimens taken from compressed plates comprising 1600 μm depth notches.

Creep tests were performed on Franck rig. Each creep station was equipped with an extensometer for strain measurements, placed in a temperature-controlled room. Creep test samples (in the shape of "dogbones") were formed from compression moulded rectangular plagues having a nominal thickness of about 2 mm. The dimension of the dogbone test bars was in accordance with ISO 527-2. The compression moulding conditions for the plaques were in accordance with ASTM D1928. In the testing, creep behaviour was monitored using the extensometer, and time to failure (in hours) was recorded under a stress of either 11.2 MPa or 11.4 MPa. Results are shown in Table 3.

TABLE 1

LMW blocks A-C polymerisation conditions

| Example | $MI_2$ 8/2 (g/10 min) | $H_2/C_2$ gas phase mol ratio (×1000) |
|---------|-----------------------|---------------------------------------|
| A | 703 | 3.75 |
| B | 770 | 3.79 |
| C | 658 | 3.60 |

TABLE 2

HMW blocks W-Z polymerisation conditions

| Example | HLMI (g/10 min) | C2 partial pressure (bar) | 1-hexene content (g) |
|---------|-----------------|---------------------------|----------------------|
| W | 0.08 | 12 | 26 |
| X | 0.11 | 12 | 26 |
| Y | 0.08 | 14 | 34 |
| Z | 0.02 | 20 | 35 |

TABLE 3

| | | Example | | | | | |
|---|---|---|---|---|---|---|---|
| | | 1 | 2 | 3 | 4 | 5 | 6 |
| LMW block | LMW Example | A | B | B | B | C | C |
| | p1 | 0.55 | 0.54 | 0.52 | 0.50 | 0.54 | 0.54 |
| | Mw (kDa) | | 18.8 | 18.8 | 18.8 | | |
| | Mw/Mn | | 2.8 | 2.8 | 2.8 | | |
| | $MI_2$8/1 (g/10 min) | 37.4 | 41.0 | 41.0 | 41.0 | 35 | 35 |
| | $MI_2$8/2 (g/10 min) | 703 | 770 | 770 | 770 | 658 | 658 |
| | Density (kg/m$^3$) | 975.2 | 974.3 | 974.3 | 974.3 | | |

TABLE 3-continued

|  |  | Example |  |  |  |  |  |
|---|---|---|---|---|---|---|---|
|  |  | 1 | 2 | 3 | 4 | 5 | 6 |
| HMW block | HMW Example | W | X | X | X | Y | Z |
|  | p2 | 0.45 | 0.46 | 0.48 | 0.50 | 0.46 | 0.46 |
|  | Mw (kDa) |  | 403.5 | 403.5 | 403.5 | 409.1 | 461 |
|  | Mw/Mn |  | 3.1 | 3.1 | 3.1 | 2.8 | 2.9 |
|  | HLMI (g/10 min) | 0.08 | 0.11 | 0.11 | 0.11 | 0.08 | 0.02 |
|  | Density (kg/m$^3$) | 920.1 | 920.5 | 920.5 | 920.5 | 919.5 | 919.2 |
| Resin blend | HLMI (g/10 min) | 13 | 22.0 | 14.9 | 10.6 | 18.7 | 10.7 |
|  | MI$_5$ (g/10 min) | 0.33 | 0.45 | 0.33 | 0.24 | 0.34 | 0.15 |
|  | HLMI/MI$_5$ | 39.4 | 48.9 | 45.2 | 44.2 | 54.5 | 71.3 |
|  | Density (kg/m$^3$) | 951.6 | 951.7 | 950.6 | 949.4 | 952.5 | 952.1 |
|  | $\mu_0$ (dPa·s) | 390700 | 304900 | 349900 | 403100 | 347500 | 504400 |
|  | $\mu_2$ (dPa·s) | 17400 | 16000 | 17600 | 19400 | 16200 | 18300 |
|  | Tg10 | 1.25 | 1.24 | 1.24 | 1.24 | 1.22 | 1.16 |
|  | Tg100 | 1.18 | 1.17 | 1.18 | 1.18 | 1.16 | 1.11 |
|  | Mn (kDa) | 11 | 11 | 12 | 12 | 11 | 12 |
|  | Mw (kDa) | 198 | 194 | 204 | 215 | 220 | 246 |
|  | Mz (kDa) | 833 | 809 | 791 | 829 | 945 | 985 |
|  | Mw/Mn | 18 | 17.4 | 17.2 | 18.6 | 19.9 | 20.1 |
|  | FNCT (hours) | 6087 |  |  |  |  |  |
|  | Creep, 11.2 MPa/ 23° C. (hours) |  | 1340 | 1121 | 927 |  |  |
|  | Creep, 11.4 MPa/ 23° C. (hours) |  | 350 | 342 | 317 |  |  |

With regard to the creep results in Table 3 above, it should be noted that the corresponding results for Example 4 of WO 02/34829 (mentioned previously in the discussion of the prior art) were 403 hours at 11.2 MPa and 128 hours at 11.4 MPa, demonstrating that this prior art resin has clearly inferior performance.

EXAMPLES 7-11

The manufacture of a polyethylene resin comprising a blend of low molecular weight and high molecular weight ethylene polymers was carried out in suspension in isobutane in, two loop reactors connected in series.

Isobutane, ethylene, hydrogen, triisobutylaluminum (TiBAl) and catalyst (catalyst A, comprising ethylene bis (4,5,6,7-tetrahydro-1-indenyl) zirconium dichloride prepared in accordance with the method of Brintzinger as published in the Journal of Organometallic Chemistry 288 (1995) pages 63 to 67) were continuously introduced into the first loop reactor and the polymerisation of ethylene was carried out in this mixture in order to form the low molecular weight homopolymer. The polymerisation conditions are specified in Table 4 below. The mixture, additionally comprising the low molecular weight homopolymer, was continuously withdrawn from the first loop reactor and was subjected to a reduction in pressure, so as to remove hydrogen. The resulting mixture was then continuously introduced into a second loop reactor serially connected to the first loop reactor together with ethylene, 1-hexene and isobutene. The polymerisation of the ethylene and 1-hexene was carried out therein in order to form the high molecular weight copolymer. The suspension comprising the polyethylene resin blend of the low molecular weight and high molecular weight ethylene polymer fractions was continuously withdrawn from the second loop reactor, and subjected to a final reduction in pressure, so as to evaporate the isobutene and the remaining reactants present (ethylene, 1-hexene and hydrogen) and to recover the polyethylene resin in form of a powder. This powder was subjected to drying in order to complete the degassing of the isobutene. The polymerization conditions in the second reactor are also specified in Table 4.

TABLE 4

|  |  | Ex. 7 | Ex. 8 | Ex. 9 | Ex. 10 | Ex. 11 |
|---|---|---|---|---|---|---|
| Reactor 1 | C$_2$= (% mol) | 5.1 | 6.0 | 5.8 | 6.1 | 4.9 |
|  | Comonomer | — | — | — | — | — |
|  | H$_2$/C$_2$= (mol %) | 0.03 | 0.03 | 0.03 | 0.04 | 0.05 |
|  | T (° C.) | 80 | 80 | 80 | 80 | 80 |
|  | Res time (h) | 1.22 | 1.25 | 1.31 | 1.29 | 1.10 |
| Reactor 2 | C$_2$= (mol %) | 12.9 | 11.8 | 11.8 | 10.7 | 10.7 |
|  | Comonomer | 1-hexene | 1-hexene | 1-hexene | 1-hexene | 1-hexene |
|  | H$_2$/C$_2$= (mol %) | 0.0 | 0.0 | 0.0 | 0.0 | 0.0 |
|  | C$_6$=/C$_2$= (mol %) | 9.8 | 7.9 | 7.3 | 6.2 | 8.26 |
|  | T (° C.) | 75 | 75 | 75 | 75 | 75 |
|  | Res time (h) | 1.17 | 1.02 | 1.09 | 1.08 | 1.08 |

The measured properties of both the low molecular weight polyethylene resin fraction and also of the final polyethylene resin are specified in Table 5, together with further measurements of the capillary viscosity (30/2 die) and dynamic viscosity. Calculated properties for the high molecular weight resin fraction are also given, with density calculated according to the following formula:

$d_{resin} = 0.56\, p_1 \cdot d_1 + 1.003\, p_2 \cdot d_2 + 0.00048\, p_1 \cdot d_1 \cdot d_2$ where $p_1$, $p_2$ are the weight fractions of Block 1 and 2 respectively, and $d_1$, $d_2$ are their densities.

TABLE 5

|  |  | Ex. 7 | Ex. 8 | Ex. 9 | Ex. 10 | Ex. 11 |
|---|---|---|---|---|---|---|
| LMW block (reactor 1) | p1 | 0.50 | 0.54 | 0.56 | 0.56 | 0.52 |
|  | MI$_2$ 8/1 (g/10 min) | 43.2 | 44.4 | 35.3 | 39.7 | 30.4 |
|  | Density (kg/m$^3$) | 975.5 | — | 974.9 | 974.3 | 972.8 |
|  | 1-hexene (g/kg) | 7 | 6 | 8 | 6 | 8 |
| HMW block (calc) | HLMI (g/10 min) | 0.09 | 0.03 | 0.03 | 0.02 | 0.06 |
|  | Density (kg/m$^3$) | 923.2 | 923.1 | 919.9 | 921.6 | 925.1 |
| Resin blend | MI$_5$ (g/10 min) | 0.14 | 0.12 | 0.20 | 0.18 | 0.21 |
|  | HLMI (g/10 min) | 5.6 | 5.7 | 8.3 | 7.1 | 7.9 |
|  | HLMI/MI$_5$ | 40 | 47.5 | 41.5 | 39.4 | 37.6 |
|  | Density (kg/m$^3$) | 951.7 | 952.9 | 952.0 | 952.8 | 952.7 |
|  | $\mu_0$ (dPa·s) | 508900 | 523500 | 443200 | 456300 | 429700 |
|  | $\mu_2$ (dPa·s) | 22600 | 21400 | 20500 | 21700 | 21000 |
|  | $\mu_0/\mu_2$ | 22.5 | 24.4 | 21.6 | 21.0 | 20.5 |
|  | $\eta_{0.01}$ (Pa·s) | 831310 | 919000 | 708500 | 766160 | 650070 |
|  | $\eta_1$ (Pa·s) | 52524.1 | 54407.8 | 46124.7 | 49268.6 | 45068 |
|  | $\eta_{0.01}/\eta_1$ | 15.8 | 16.9 | 15.4 | 15.5 | 14.4 |
|  | FNCT (h) | >3000 |  | >3000 |  |  |

Compounding

To the resins of Examples 7 to 11 were added, per 100 parts of polyethylene composition, 0.3 parts by weight of antioxidant IRGANOX® B225, 0.3 parts by weight of antioxidant IRGANOX® B900, 0.1 parts by weight of calcium stearate and 2.25 parts by weight of carbon black.

The resultant composition was extruded on a compounding device comprising a melting zone (single screw extruder, 90 mm screw diameter, 24D length) and a homogenising zone (single screw extruder, 90 mm diameter screw, 36D length) at a rate of 40 kg/hr and with a residence time of 540 seconds. At the end of the compounding device, the resulting compound was passed through a strand pelletiser and pellets of the resulting compound were recovered and examined. The results obtained are presented in Table 6.

The carbon black dispersion parameters (hereunder called dispersion and distribution) are measured by microscopy, in accordance to ISO18553. For dispersion, the lower number the better: for distribution, A1 is best, followed by A2, B1, B2, C1 etc. Generally, the resins of the invention have a dispersion quotation according to this standard which is lower than 2, and a distribution quotation better than B2, when extruded and pelletised in a single pass.

| Example | Carbon black dispersion | Carbon black distribution |
|---|---|---|
| 7 | 0.3 | A2 |
| 8 | 0.7 | A2 |
| 9 | 0.6 | A2 |
| 10 | 0.6 | A2 |
| 11 | 0.4 | A2 |

The invention claimed is:

1. A polyethylene resin comprising from 47 to 55 wt % of a high molecular weight polyethylene fraction, and from 45 to 53 wt % of a low molecular weight polyethylene fraction; the high molecular weight polyethylene fraction comprising a linear low density polyethylene having a density of from 0.913 to 0.923 g/cm$^3$, and an HLMI of from 0.02 to 0.2 g/10 min;

and the low molecular weight polyethylene fraction comprising a high density polyethylene having a density of at least 0.969 g/cm$^3$ and an MI$_2$ (8/2) of greater than 100 g/10 min;

wherein the relationship between the density D of the resin in g/cm$^3$ and the weight fraction of the low molecular weight fraction $P_1$ is defined by $0.055P_1 + 0.916 < D < 0.034P_1 + 0.937$.

2. Polyethylene resin according to claim 1, having a dynamical viscosity $\eta_{0.01}$, measured at 0.01 radian/second, of greater than 200,000 Pa·s and a ratio of dynamical viscosities measured at respectively 0.01 and 1 radian/second, $\eta_{0.01}/\eta_1$, of greater than 8.

3. Polyethylene resin according to claim 1, having a time to failure under a stress of 11.2 MPa and at a temperature of 23° C. in a creep test performed on a 2 mm thick dogbone-shaped plaque of said resin of greater than 500 hours.

4. A polyethylene resin according to claim 1 having a dynamical viscosity $\eta_{0.01}$, measured at 0.01 radian/second, of greater than 200,000 Pa·s and a ratio of dynamical viscosities measured at respectively 0.01 and 1 radian/second, $\eta_{0.01}/\eta_1$, of greater than 8, and a time to failure, at a stress of 11.2 MPa and a temperature of 23° C., in a creep test performed on a 2 mm thick dogbone-shaped plaque of said resin of greater than 500 hours.

5. Polyethylene resin according to any one of claims 2 to 4, wherein the dynamical viscosity $\eta_{0.01}$, measured at 0.01 radian/second, is greater than 500,000 Pa·s, and the ratio of dynamical viscosities measured at respectively 0.01 and 1 radian/second, $\eta_{0.01}/\eta_1$, is greater than 10.

6. A polyethylene resin according to claim 1, wherein the density of the resin is at least 0.945 g/cm$^3$.

7. A polyethylene resin according to claim 1, wherein the HLMI of the high molecular weight fraction is from 0.02 to 0.15 g/10 min.

8. A polyethylene resin according to claim 1, wherein the MI$_2$ of the low molecular weight fraction is from 200 to 1000 g/10 min.

9. A polyethylene resin according to claim 1, wherein the density of the high molecular weight fraction is from 0.915 to 0.922 g/cm³.

10. A polyethylene resin according to claim 1, wherein the density of the low molecular weight fraction is from 0.970 to 0.990 g/cm³.

11. A polyethylene resin according to claim 1, wherein the polydispersity index D of the low molecular weight fraction is from 2 to 6.

12. A polyethylene resin according to claim 1, wherein the polydispersity index D of the high molecular weight fraction is from 2 to 6.

13. A polyethylene resin according to claim 1, wherein the density is from 0.948 to 0.954 g/cm³.

14. A polyethylene resin according to claim 1, wherein the HLMI is from 3 to 50 g/10 min.

15. A polyethylene resin according to claim 1, wherein the relationship between the density D of the resin in g/cm³ and the weight fraction of the low molecular weight fraction $P_1$ is defined by $0.055P_1+0.919<D<0.0341 P_1+0.937$.

16. A polyethylene resin according to claim 1, wherein the ratio $HLMI/MI_5$ is at least 30.

17. A polyethylene resin according to claim 1, which has a carbon black dispersion parameter of 2 or better, and a carbon black distribution parameter of B2 or better, as measured by microscopy in accordance with ISO18533, following extrusion and pelletisation in a single pass.

18. A polyethylene resin according to claim 17, wherein the carbon black dispersion parameter is 1 or better, and the carbon black distribution parameter is B1 or better.

19. A pipe or a fitting comprising a polyethylene resin as defined in claim 1.

20. A polyethylene resin according to claim 16, wherein the ratio of $HLMI/MI_5$ is at least 35.

* * * * *